United States Patent
Mills

(10) Patent No.: US 11,280,249 B2
(45) Date of Patent: Mar. 22, 2022

(54) HYBRID COOLANT PUMP

(71) Applicant: HANON SYSTEMS EFP CANADA LTD., Concord (CA)

(72) Inventor: Kyle D. Mills, Etobicoke (CA)

(73) Assignee: Hanon Systems EFP Canada Ltd., Concord (CA)

(*) Notice: Subject to any disclaimer, the term of this patent is extended or adjusted under 35 U.S.C. 154(b) by 50 days.

(21) Appl. No.: 16/634,458

(22) PCT Filed: Aug. 6, 2018

(86) PCT No.: PCT/IB2018/055919
§ 371 (c)(1),
(2) Date: Jan. 27, 2020

(87) PCT Pub. No.: WO2019/030658
PCT Pub. Date: Feb. 14, 2019

(65) Prior Publication Data
US 2021/0079830 A1  Mar. 18, 2021

Related U.S. Application Data

(60) Provisional application No. 62/541,844, filed on Aug. 7, 2017.

(51) Int. Cl.
*F01P 5/12* (2006.01)
*F04D 13/02* (2006.01)
(Continued)

(52) U.S. Cl.
CPC .............. *F01P 5/12* (2013.01); *F04D 13/024* (2013.01); *F04D 27/004* (2013.01);
(Continued)

(58) Field of Classification Search
CPC .......... F01P 5/12; F04D 13/06; F04D 13/021; F04D 13/024; F04D 15/00; F16D 27/108
See application file for complete search history.

(56) References Cited

U.S. PATENT DOCUMENTS 9,004,251 B2 * 4/2015 Ikegawa ............... F16D 27/105
    192/81 C
9,768,542 B2 * 9/2017 VanZuilen ......... H01R 12/7076
(Continued)

FOREIGN PATENT DOCUMENTS

CN        105275572 A     1/2016
DE    102011076719 A1    12/2012
(Continued)

OTHER PUBLICATIONS

Extended European Search Report regarding EP 18844221.4, dated Apr. 1, 2021.

*Primary Examiner* — Brian P Wolcott
*Assistant Examiner* — Jackson N Gillenwaters
(74) *Attorney, Agent, or Firm* — Harness, Dickey & Pierce, P.L.C.

(57) ABSTRACT

A hybrid coolant pump assembly comprises a housing, a bearing shaft, and an impeller apparatus. The bearing shaft is rotatably supported within an internal cavity of the housing. A first clutch is disposed on the bearing shaft and is operable to drivingly interconnect an input member and the bearing shaft when in an engaged state. The impeller apparatus is positioned about the bearing shaft and configured to pump a fluid. A rotor, disposed within the internal cavity of the housing, extends about the bearing shaft. A stator, disposed within the internal cavity of the housing, extends about the rotor. The rotor rotates relative to the stator and the bearing shaft when the stator is electrically energized. The impeller apparatus is rotatably driven by the bearing shaft when the first clutch is in the engaged state. The impeller apparatus is rotatably driven by the rotor when the stator is electrically energized.

15 Claims, 5 Drawing Sheets

(51) Int. Cl.
*F04D 27/00* (2006.01)
*F04D 29/043* (2006.01)
*F04D 29/046* (2006.01)
*F04D 29/20* (2006.01)
*F04D 15/00* (2006.01)

(52) U.S. Cl.
CPC ......... *F04D 29/043* (2013.01); *F04D 29/046* (2013.01); *F04D 29/20* (2013.01); *F04D 15/00* (2013.01)

(56) References Cited

U.S. PATENT DOCUMENTS

| | | | | |
|---|---|---|---|---|
| 2011/0115313 | A1* | 5/2011 | Lee | H02K 11/33 310/43 |
| 2013/0259720 | A1* | 10/2013 | Mills | F04D 13/06 417/410.1 |
| 2014/0017073 | A1* | 1/2014 | Muizelaar | F04D 29/026 415/177 |
| 2014/0023526 | A1* | 1/2014 | Roby | F04D 29/043 417/223 |
| 2014/0174873 | A1 | 6/2014 | Qin | |
| 2014/0174874 | A1* | 6/2014 | Qin | F16D 13/76 192/66.32 |
| 2015/0037177 | A1 | 2/2015 | Buchholz et al. | |
| 2016/0252000 | A1 | 9/2016 | VanZuilen | |
| 2016/0341203 | A1* | 11/2016 | Parsons | F04D 15/0027 |
| 2017/0058915 | A1* | 3/2017 | Liang | F04D 13/0626 |
| 2017/0211461 | A1 | 7/2017 | Buchholz et al. | |
| 2021/0140433 | A1* | 5/2021 | Humer | F04B 17/03 |

FOREIGN PATENT DOCUMENTS

| | | | |
|---|---|---|---|
| GB | 2404220 A | 1/2005 | |
| WO | 2015166458 A1 | 11/2015 | |
| WO | 2016115641 A1 | 7/2016 | |
| WO | WO-2017051283 A1 * | 3/2017 | ............ F16D 41/00 |

* cited by examiner

HYBRID COOLANT PUMP

CROSS-REFERENCE TO RELATED APPLICATIONS

This application is a 371 National Phase of PCT/IB2018/055919, filed on Aug. 6, 2018, which claims the benefit of U.S. Provisional Application No. 62/541,844 filed on Aug. 7, 2017. The entire disclosures of the applications referenced above are incorporated herein by reference.

FIELD

The present disclosure generally relates to coolant pumps for use with engines, including internal combustion engines in vehicles such as automobiles.

BACKGROUND

This section provides background information related to the present disclosure which is not necessarily prior art.

Engines are commonly equipped with liquid cooling systems. Such engines are often referred to in the art as "water-cooled engines." Engines that lack a liquid cooling system are typically cooled by ambient air. These engines are often referred to as "air-cooled engines." Water-cooled engines are often fitted with one or more coolant pumps, sometimes referred to as "water pumps," that operate to pump coolant (e.g. water) through the cooling system of an engine. Such cooling systems, sometimes referred to as "closed loop cooling systems," often include one or more heat exchangers (i.e. radiators), coolant lines, water jackets, and other components both internal and external to the engine. The coolant that is pumped through the cooling system, which may be water, a mixture of water and anti-freeze, or some other fluid, operates to carry heat away from the engine such that proper operating temperatures can be maintained.

Historically, water pumps in engine cooling systems have been mechanical pumps that are driven by the engine. The volume flowrate (i.e. pumping capacity) of mechanical pumps change linearly with engine speed. Because of this, mechanical pumps need to be oversized in order to provide sufficient coolant flow during low speed operation of the engine (i.e. when the engine is at low RPMs). The coolant flow produced by mechanical pumps can be controlled in a number of ways. The pump can be clutched, which provides on-off flow, but will not provide flow when the engine is not running (i.e. when the engine is turned off). A control valve may be fitted to either the pump itself or elsewhere in the liquid cooling system to turn coolant flow on or off. This solution also does not provide coolant flow when the engine is off.

Electric pumps have also been used in engine cooling systems. One advantage of electric pumps is that the pump speed and therefore coolant flowrate can be controlled independently of engine speed. Coolant flow can also be provided when the engine is off. However, electric pumps also have drawbacks. Electric pumps are not always an option because their electrical power requirements are too high in some engine applications. For example, some alternators are not able to support the voltage and/or current draw of electric coolant pumps. Accordingly, there remains a need for an improved engine coolant pump.

SUMMARY

This section provides a general summary of the disclosure, and is not a comprehensive disclosure of its full scope or all of its features.

A hybrid coolant pump assembly comprising a housing, a bearing shaft, and an impeller apparatus. The housing defines an internal cavity and the bearing shaft is rotatably supported within the internal cavity. A first clutch is disposed on the bearing shaft. The first clutch is operable to drivingly interconnect an input member and the bearing shaft in an engaged state. The impeller apparatus is positioned about the bearing shaft and is configured to pump a fluid. A rotor, disposed within the internal cavity of the housing, extends about the bearing shaft. A stator, disposed within the internal cavity of the housing, extends about the rotor. The rotor rotates relative to the stator and the bearing shaft when the stator is electrically energized. The impeller apparatus is rotatably driven by the bearing shaft when the first clutch is in the engaged state. The impeller apparatus is rotatably driven by the rotor when the stator is electrically energized.

Advantageously, the hybrid coolant pump assembly of the subject disclosure has many of the advantages of mechanical pumps and many of the advantages of electric pumps, without the associated drawbacks. The hybrid coolant pump assembly also benefits from a simple design with few moving parts, providing cost and complexity improvements over existing coolant pumps. Additionally, by having the rotor submersed in the coolant and de-coupled from the bearing shaft, rotation of the rotor is not hindered by drag between the bearing shaft and the housing or shaft seal. This provides greater efficiency and allows for more electrical power. Another benefit of the disclosed hybrid coolant pump assembly is that only one electrical connector can be used for the electric pump and the first clutch as these components in the hybrid coolant pump assembly are co-located.

BRIEF DESCRIPTION OF THE DRAWINGS

The drawings described herein are for illustrative purposes only of selected embodiments and not all possible implementations, and are not intended to limit the scope of the present disclosure. Other advantages of the present disclosure will be readily appreciated, as the same becomes better understood by reference to the following detailed description when considered in connection with the accompanying drawings wherein.

DETAILED DESCRIPTION

Figure 1:
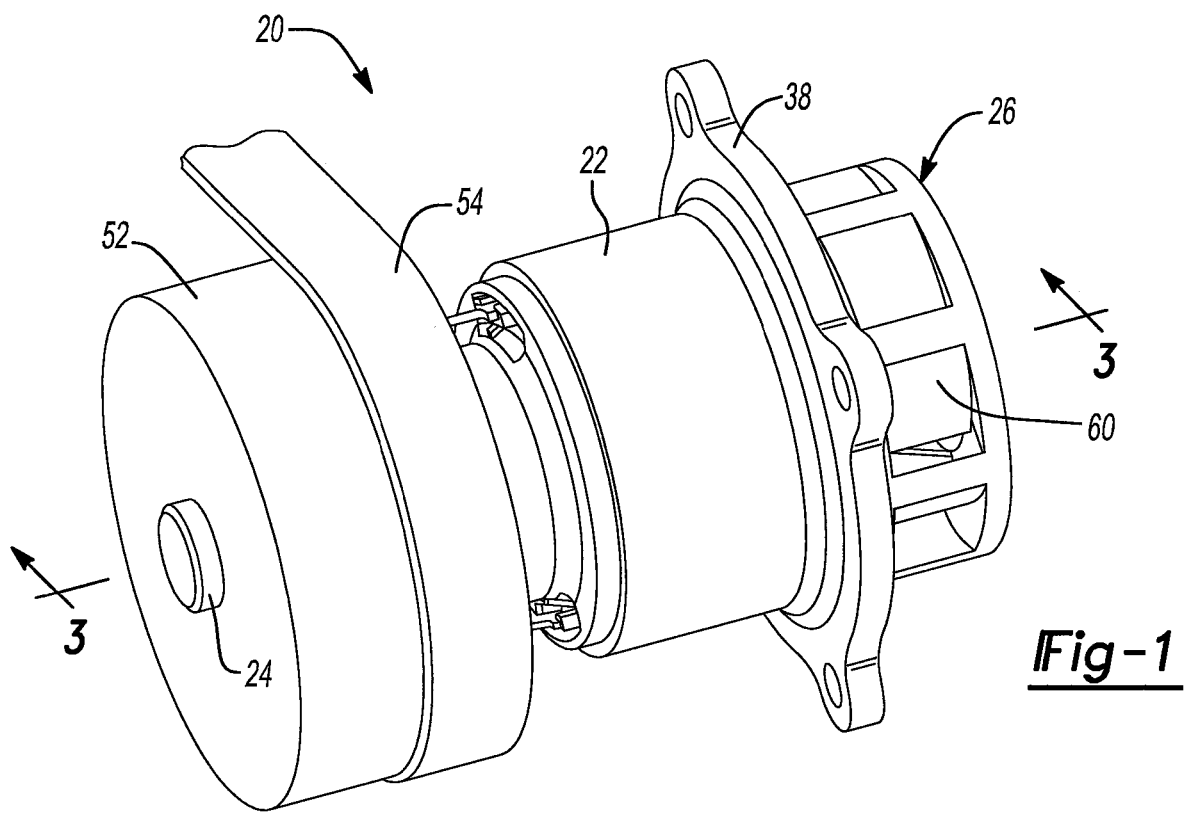
FIG. 1 is a side perspective view of an exemplary hybrid coolant pump assembly that is constructed in accordance with the subject disclosure.
Figure 2:
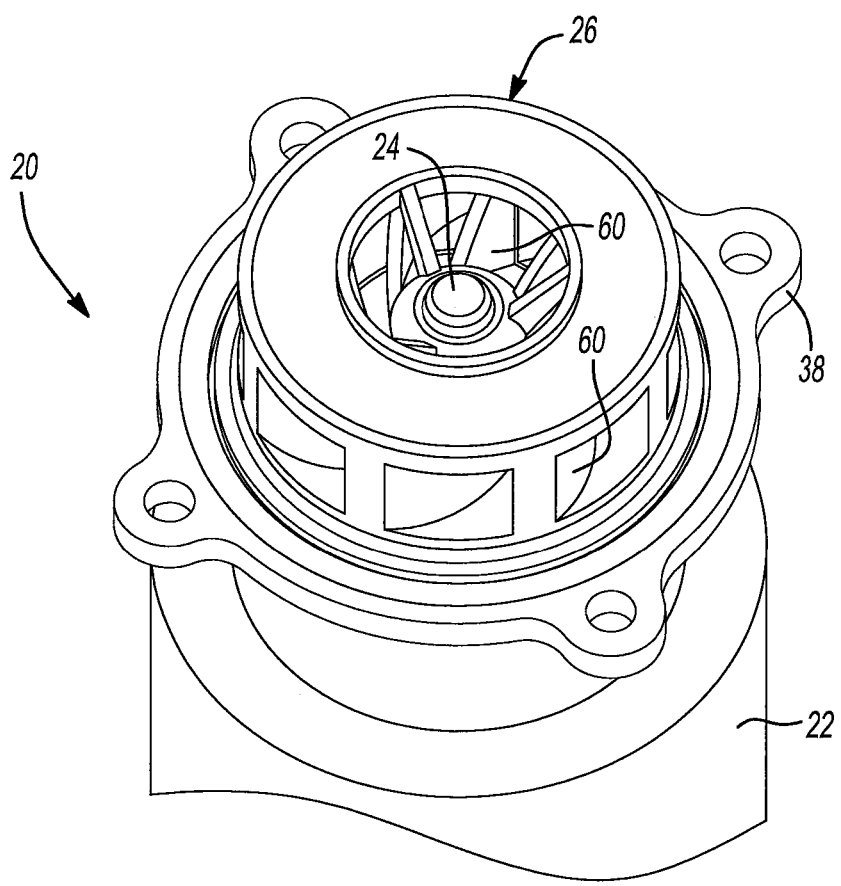
FIG. 2 is a front perspective view of the exemplary hybrid coolant pump assembly illustrated in FIG. 1.

Referring to the Figures, wherein like numerals indicate corresponding parts throughout the several views, a hybrid coolant pump assembly 20 for pumping engine coolant is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, the hybrid coolant pump assembly 20 of the subject disclosure generally includes a housing 22, a bearing shaft 24, and an impeller apparatus 26. Coolant pump assemblies of this type, sometimes referred to as "water pumps," operate to pump coolant (e.g. water) through a cooling system of an engine. Such cooling systems, sometimes referred to as "closed loop cooling systems," often include one or more heat exchangers (i.e. radiators), coolant lines, water jackets, and other components both internal and external to the engine. The coolant that is pumped through the cooling system, which may be water, a mixture of water and anti-freeze, or some other fluid, operates to carry heat away from the engine such that proper operating temperatures can be maintained.

The housing 22 of the hybrid coolant pump assembly 20 of the subject disclosure extends longitudinally along a longitudinal axis 28 between a first housing end 30 and a second housing end 32. It should be appreciated that when the terms "longitudinal" and "longitudinally" are used herein, they refer to a direction or orientation that is arranged co-axially with or parallel to the longitudinal axis 28 of the housing 22. The housing 22 includes a first housing portion 34 adjacent the first housing end 30 and a second housing portion 36 adjacent the second housing end 32.

The housing 22 also includes a flange 38 that extends radially outwardly from the second housing end 32. The flange 38 is configured to abut an opposing mating surface on the engine (not shown) or an impeller cover (not shown). The housing 22 defines a first internal cavity 40 arranged within the first housing portion 34 and a second internal cavity 41 within the second housing portion 36. The first and second internal cavities 40, 41 may optionally be arranged co-axially with the longitudinal axis 28. Although a variety of different shapes and materials are possible, in one non-limiting example, the housing 22 may be made of aluminum and the first and second housing portions 34, 36 may be generally cylindrical in shape.

The bearing shaft 24 of the hybrid coolant pump assembly 20 is rotatably supported within the first and second internal cavities 40, 41 of the housing 22. In the illustrated example, the bearing shaft 24 extends co-axially with the longitudinal axis 28 between a first shaft end 42 and a second shaft end 44. The bearing shaft 24 includes a first shaft segment 46 that is adjacent to the first shaft end 42 and a second shaft segment 48 that is adjacent to the second shaft end 44. The first shaft segment 46 extends longitudinally past the first housing end 30 and the second shaft segment 48 extends longitudinally through the second housing portion 36 and past the second housing end 32. Although a variety of different shapes and materials are possible, in one non-limiting example, the first shaft segment 46 and the second shaft segment 48 of the bearing shaft 24 may be made of steel and may have generally cylindrical shapes where an outside diameter of the first shaft segment 46 is larger than an outside diameter of the second shaft segment 48. An outer ring 49 is radially spaced from and extends annularly about the first shaft segment 46. The outer ring 49 is disposed in the first internal cavity 40 of the housing 22 in a press fit such that the outer ring 49 does not rotate relative to the housing 22. The first shaft segment 46 of the bearing shaft 24 is supported in the housing by one or more bearings 50 that allow the bearing shaft 24 to freely rotate relative to the housing 22. The bearings 50 are positioned radially between the outer ring 49 and the first shaft segment 46 of the bearing shaft 24. The bearings 50 are supported in bearing cages 51. The bearings 50 may be greased. End seals 53 extend radially between the outer ring 49 and the first shaft segment 46 to retain the grease and to keep contaminants away from the bearings 50. It should be appreciated that various different types of bearings 50 may be used. By way of example and without limitation, the bearings 50 may be ball-ball bearings or ball-roller bearings.

The hybrid coolant pump assembly 20 includes a first clutch 52 that is disposed on the first shaft segment 46 of the bearing shaft 24 adjacent to the first shaft end 42. The first clutch 52 is configured to be mechanically driven by the engine. By way of example and without limitation, the first clutch 52 may be driven by an engine driven belt 54 such that the first clutch 52 acts as a pulley. The first clutch 52 has an engaged state and a disengaged state. In the engaged state, the first clutch 52 is rotationally fixed with and rotatably drives the bearing shaft 24. In the disengaged state, the bearing shaft 24 is free to rotate relative to the first clutch 52. In the illustrated example, a clutch activation mechanism 56 extends annually about the first housing portion 34 adjacent to the first end of the housing 22. The clutch activation mechanism 56 operably controls engagement of the first clutch 52 between the engaged state and the disengaged state. More particularly, the first clutch 52 may be an electromagnetic clutch and the clutch activation mechanism 56 may be a clutch activation coil. The clutch activation coil may include a plurality of windings 58 made of copper or another conductive material. The clutch activation mechanism 56 operably generates a magnetic force when electricity is applied to the windings 58, which operates in a longitudinal direction to either attract or repel one or more clutch plates (not shown) of the first clutch 52 and thereby switch the first clutch 52 between the engaged and disengaged states.

The impeller apparatus 26 of the hybrid coolant pump assembly 20 is positioned about the second shaft segment 48 of the bearing shaft 24 adjacent to the second shaft end 44. The impeller apparatus 26 is configured to pump engine coolant as it rotates. Although a variety of different shapes and configurations are possible, in the illustrated embodiment, the impeller apparatus 26 includes a plurality of vanes 60 that operate to pump the engine coolant. Although a variety of different materials may be used, in one non-limiting example, the impeller apparatus 26 may be made of an engineering plastic, such as polyphenylene sulfide (PPS).

Figure 3:
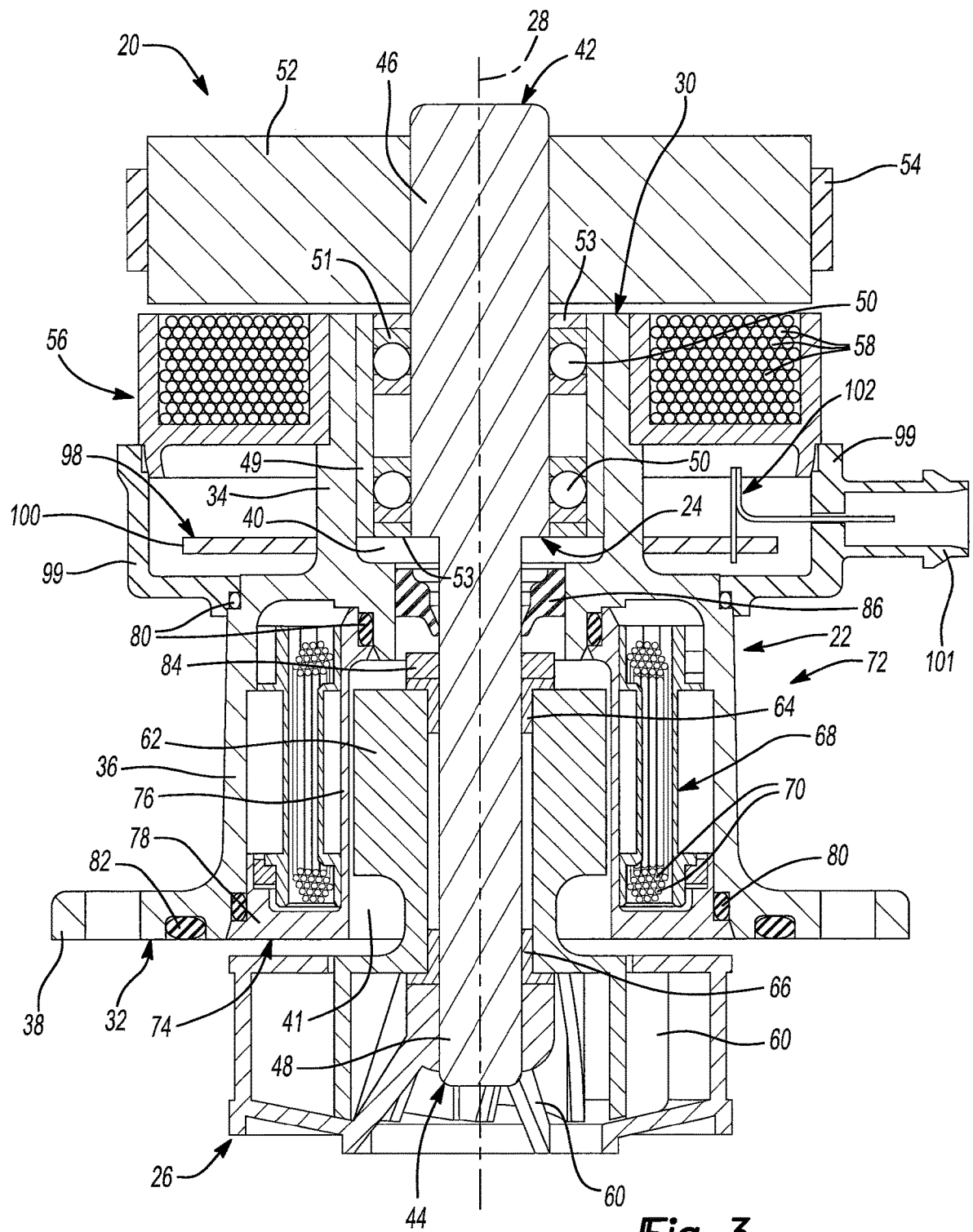
FIG. 3 is a side cross-sectional view of the exemplary hybrid coolant pump assembly illustrated in FIG. 1 taken along section line 3-3.

With reference to FIG. 3, the hybrid coolant pump assembly 20 includes a rotor 62 that extends annularly about the second shaft segment 48 of the bearing shaft 24. The rotor 62 is therefore disposed within the second internal cavity 41 of the housing 22 at the second housing portion 36. The rotor 62 is rotatably supported on the second shaft segment 48 by a first bushing 64 and a second bushing 66. At least a portion of the first bushing 64 and the second bushing 66 is disposed radially between the rotor 62 and the second shaft segment 48. The first and second bushings 64, 66 may be made of a low friction material. Accordingly, the rotor 62 is free to rotate relative to the bearing shaft 24 and the housing 22. A stator 68 extends annularly about the rotor 62 and is disposed within the second internal cavity 41 of the housing 22 at the second housing portion 36. The stator 68 may include a plurality of windings 70 made of copper or another conductive material. The stator 68 operably generates a magnetic force when electricity is applied to the windings, which operates to drive rotation of the rotor 62, relative to the stator 68, in either a clockwise or counterclockwise direction about the longitudinal axis 28 when electricity is applied to the windings 70 of the stator 68. As such, the rotor 62 and stator 68 of the hybrid coolant pump together form an electric motor 72. Although a variety of different materials may be used, in one non-limiting example, the rotor 62 may be made of a lamination of steel and rare earth metal magnets.

Optionally, a sleeve 74 including a longitudinal section 76 and an end section 78 is positioned within the second internal cavity 41 of the housing 22. The longitudinal section 76 of the sleeve 74 extends longitudinally within the second housing portion 36 and is positioned radially between the stator 68 and the rotor 62. The end section 78 of the sleeve 74 extends radially outwardly at the flange 38. The sleeve 74 operates to seal the stator 68 off from the coolant. As such, a plurality of seals 80 may be provided between the sleeve 74 and the housing 22 to prevent fluid from flowing between the sleeve 74 and the housing 22. Although the plurality of seals 80 may have a variety of different configurations, in the illustrated example, the plurality of seals 80 are rubber O-rings. The hybrid coolant pump assembly 20 may also include a gasket seal 82 that is disposed in a groove in the flange 38 of the housing 22. Although the gasket seal 82 may have a variety of different configurations, in the illustrated example, the gasket seal 82 is also a rubber O-ring.

The hybrid coolant pump assembly 20 may additionally include an axial limiter 84 and a shaft seal 86. As shown in FIG. 3, the axial limiter 84 extends annularly about the second shaft segment 48 and is disposed within the second internal cavity 41 of the housing 22. The axial limiter 84 abuts (i.e. contacts) the first bushing 64 to limit movement of the rotor 62 relative to the bearing shaft 24 along the longitudinal axis 28. The shaft seal 86 is disposed within the housing 22 at a position that is longitudinally between the axial limiter 84 and the medial shaft segment 50. The shaft seal 86 separates the first and second internal cavities 40, 41 of the housing 22. The shaft seal 86 extends radially between the second shaft segment 48 and the housing 22 to provide a fluid-tight seal between the bearing shaft 24 and the housing 22 and therefore prevents coolant in the second internal cavity 41 from entering the first internal cavity 40. It should therefore be appreciated that the rotor 62, the first and second bushings 64, 66, and at least part of the second shaft segment 48 operate submersed in the coolant, while the bearings 50 operate in a dry environment (e.g. in air).

The impeller apparatus 26 of the hybrid coolant pump assembly 20 is rotatably driven by the bearing shaft 24 and/or the rotor 62 depending upon engagement of the first clutch 52 and the application of electricity to the stator 68. For example, the impeller apparatus 26 is driven by the bearing shaft 24 when the first clutch 52 is in the engaged state. By contrast, the impeller apparatus 26 is driven by the rotor 62 when electricity is supplied to the stator 68. The hybrid coolant pump may thus be considered a hybrid between a mechanical coolant pump that is exclusively driven by the mechanical output of the engine and an electric coolant pump that is exclusively driven by electricity. Advantageously, because the rotor 62 is rotatably supported on the bearing shaft 24, rotation of the rotor 62 is not frictionally limited (i.e. restricted) by the shaft seal 86 or other bearings (not shown) so the magnetic force that the stator 68 applies to the rotor 62 faces less resistance and a more efficient system is provided.

Figure 4:
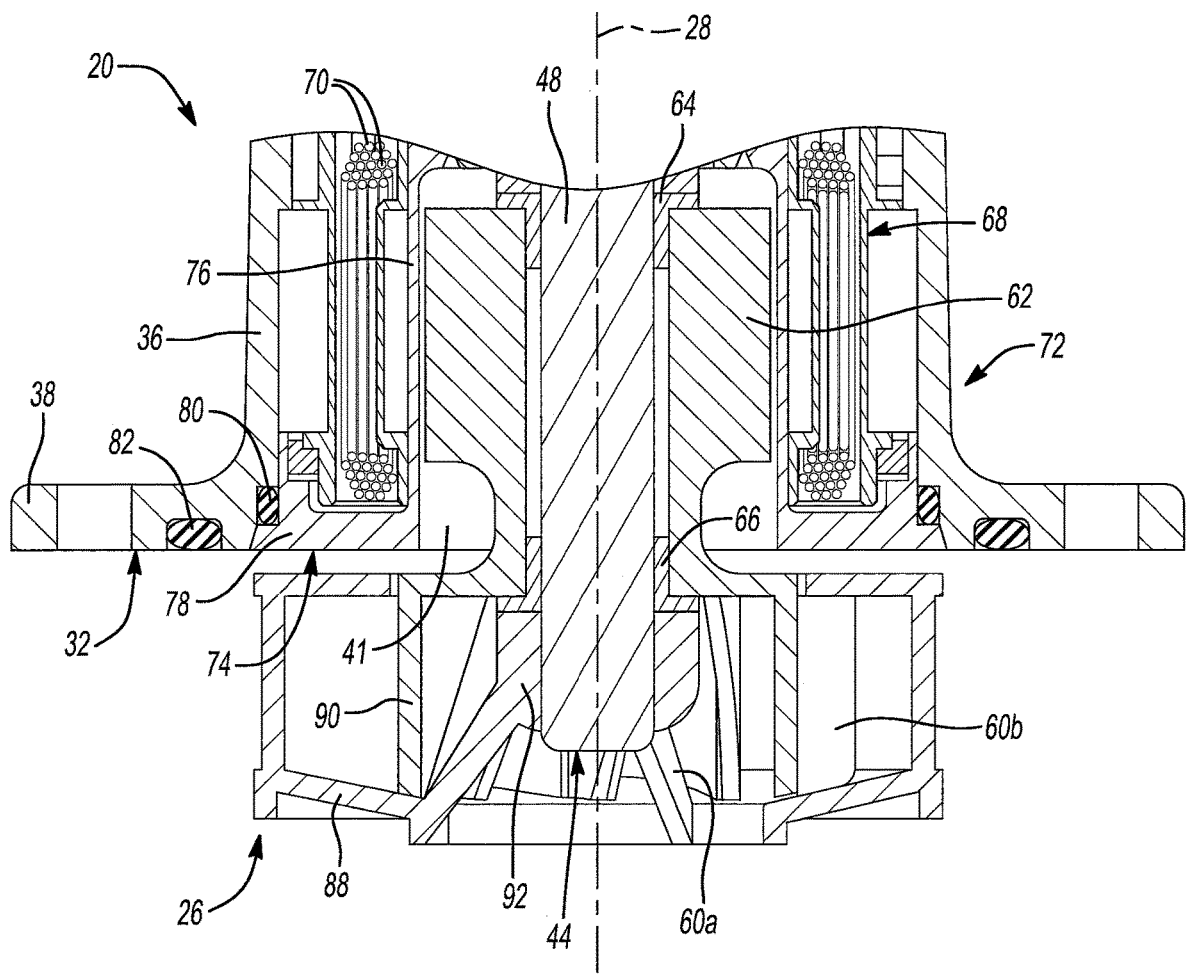
FIG. 4 is an enlarged side cross-sectional view of the exemplary hybrid coolant pump assembly illustrated in FIG. 1 showing an impeller apparatus comprising a first impeller and a second impeller.
Figure 5:
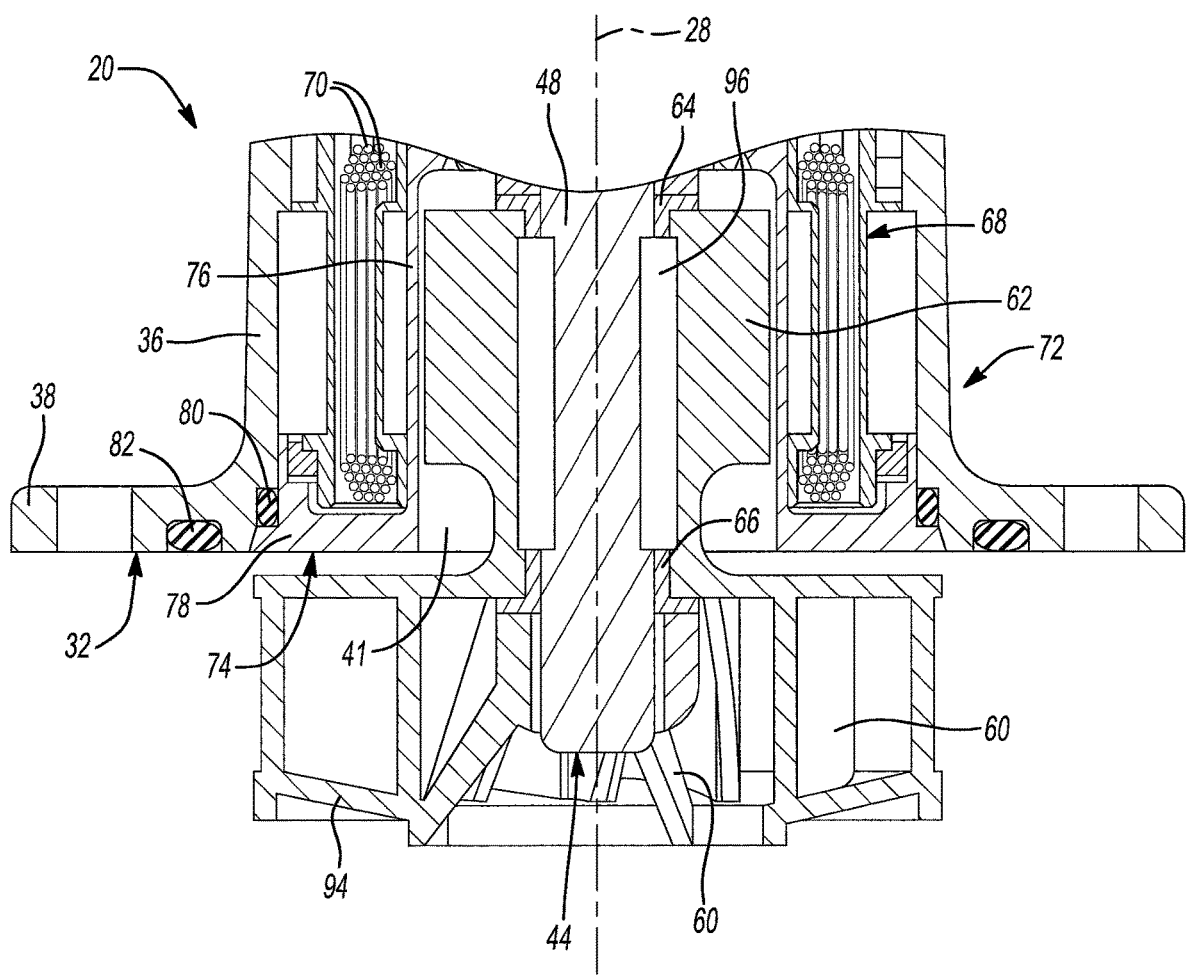
FIG. 5 is an enlarged side cross-sectional view of the exemplary hybrid coolant pump assembly illustrated in FIG. 1 showing an impeller apparatus comprising a single impeller.

The impeller apparatus 26 may take several forms. For example, the impeller apparatus 26 may have a two-piece design (FIG. 4) or a one-piece design (FIG. 5). With reference to FIG. 4, the impeller apparatus 26 includes a first impeller 88 and a second impeller 90. The first impeller 88 includes a hub portion 92 that is rotatably coupled (e.g. fixed to) with the second shaft segment 48 adjacent the second shaft end 44 such that the first impeller 88 rotates with the bearing shaft 24. For example and without limitation, the hub portion 92 of the first impeller 88 may be press-fit onto the second shaft segment 48. The plurality of vanes 60a of the first impeller 88 extend radially outwardly from the hub portion 92 of the first impeller 88 and the second bushing 66 is positioned longitudinally between the rotor 62 and the hub portion 92 of the first impeller 88. The second impeller 90 is rotatably coupled with the rotor 62 such that the second impeller 90 rotates with the rotor 62. For example, the second impeller 90 may be integral (e.g. overmolded) with the rotor 62 or may be a separate component that is secured to the rotor 62. Regardless, the plurality of vanes 60b of the second rotor 62 extend radially outwardly from a position adjacent the rotor 62. The first and second impellers 88, 90 are independently rotatable relative to one another such that the first impeller 88 may rotate at a different speed than the second impeller 90. Similarly, the first impeller 88 may rotate while the second rotor 62 is stationary and vice versa. Although other configurations may be possible, in the example illustrated, the first and second impellers 88, 90 are co-axially arranged and longitudinally co-aligned with the longitudinal axis 28 such that the second impeller 90 is nested within the first impeller 88. Alternatively, the first and second impellers 88, 90 could be stacked relative to one another at different longitudinal locations on the second shaft segment 48.

The hybrid coolant pump assembly 20 illustrated in FIG. 4 has three operational modes: a zero flow mode, an electric drive mode, and a mechanical drive mode. In the zero-flow or idle mode, the first clutch 52 is actuated to be in the disengaged state and electricity is not supplied to the stator 68. As a result, neither the bearing shaft 24 nor the rotor 62 is rotatably driven and the impeller apparatus 26 does not pump the engine coolant. In the electric drive mode, the first clutch 52 is actuated to be in the disengaged state and electricity is supplied to the stator 68. As a result, only the rotor 62 is rotatably driven and the second impeller 90 of the impeller apparatus 26 pumps the engine coolant at a coolant flow rate that is a function of the rotational speed of the rotor 62. In the electric drive mode, the rotational speed of the rotor 62 and thus the second impeller 90 can be varied by an electronic control unit 98 that controls the current going to the individual phases of the stator 68 (typically 3 phases) in sinusoidal patterns. Speed can be determined either using sensorless control by picking up the back-EMF off of the windings 70 of the stator 68, or using an encoder or other type of speed sensor. In the electric drive mode, the coolant flow is independent of engine speed.

In the mechanical drive mode, the first clutch 52 is actuated to be in the engaged state and electricity is not supplied to the stator 68. As a result, only the bearing shaft 24 is rotatably driven and the first impeller 88 of the impeller apparatus 26 pumps the engine coolant at a coolant flow rate that is a function of the engine speed. Bearing shaft 24 may be driven at a speed directly proportional to the engine speed. The second impeller 90 and thus the rotor 62 may or may not rotate in the mechanical drive mode, but any rotation of the rotor 62 does not actively drive the second impeller 90 of the impeller assembly.

With reference to FIG. 5, the impeller apparatus 26 includes a single impeller 94 that is rotatably coupled with the rotor 62 such that the single impeller 94 rotates with the rotor 62. The single impeller 94 may be integral (e.g. overmolded) with the rotor 62 or may be a separate component that is secured to the rotor 62. The single impeller 94 is not rotatably coupled with the bearing shaft 24 and therefore can rotate independent of the bearing shaft 24. In accordance with this configuration of the impeller apparatus 26, the hybrid coolant pump assembly 20 additionally includes a second clutch 96 that is disposed radially between the second shaft segment 48 and the rotor 62. The second clutch 96 may be configured as a one-way clutch that transfers torque from the bearing shaft 24 to the rotor 62, while permitting the rotor 62 to over-run the bearing shaft 24 at a rotational speed that is greater than a rotational speed of the bearing shaft 24. Accordingly, the magnetic force produced by the stator 68 drives rotation of the rotor 62 and thus the single impeller 94 when the rotational speed of the rotor 62 exceeds the rotational speed of the bearing shaft 24. This condition may occur, for example, when the engine is being operated at low speed (i.e. low RPMs). By contrast, the bearing shaft 24 either alone or in combination with the magnetic force produced by the stator 68 drives rotation of the rotor 62 and thus the single impeller 94 when the rotational speed of the bearing shaft 24 equals the rotational speed of the rotor 62. This condition may occur, for example, when the engine is being operated at high speed (i.e. high RPMs).

The hybrid coolant pump assembly 20 illustrated in FIG. 5 also has three operational modes: the zero flow mode, the electric drive mode, and the mechanical drive mode. In the zero flow mode, the first clutch 52 is actuated to be in the disengaged state and electricity is not supplied to the stator 68. As a result, neither the bearing shaft 24 nor the rotor 62 is rotatably driven and the impeller apparatus 26 does not pump the engine coolant. In the electric drive mode, the first clutch 52 is actuated to be in the disengaged state and electricity is supplied to the stator 68. As a result, only the rotor 62 is rotatably driven and the single impeller 94 of the impeller apparatus 26 pumps the engine coolant at a coolant flow rate that is a function of the rotational speed of the rotor 62. In the electric drive mode, the rotational speed of the rotor 62 and thus the single impeller 94 can be varied (i.e. changed) by varying the voltage and/or current of the electricity supplied to the stator 68. In the electric drive mode, the coolant flow is independent of engine speed. In the mechanical drive mode, the first clutch 52 is actuated to be in the engaged state and electricity may or may not be supplied to the stator 68. The bearing shaft 24 rotatably drives the single impeller 94 of the impeller apparatus 26 pumps only when the rotational speed of the bearing shaft 24 exceeds the rotational speed of the rotor 62. One advantage of this design is that drag associated with rotation of the electric motor 72 in the mechanical drive mode is eliminated.

With reference to FIG. 3, the electronic control unit 98 of the hybrid coolant pump assembly 20 extends annularly about the first housing portion 34. A cover 99 extends annularly about the electronic control unit 98 and abuts the clutch activation mechanism 56 and the second housing portion 36. The cover 99 protects the electronic control unit 98. Optionally, a seal 80 may also be placed between the cover 99 and the second housing portion 36 to provide a fluid-tight seal between the cover 99 and the second housing portion 36. The electronic control unit 98 includes a printed circuit board 100 (i.e. PCB). The electronic control unit 98 is electrically connected to the windings 58 of the clutch activation mechanism 56 and the windings 70 of the stator 68. Accordingly, the electronic control unit 98 controls the operation of the clutch activation mechanism 56 and the stator 68 and switches the hybrid coolant pump assembly 20 between the zero flow mode, the electric drive mode, and the mechanical drive mode. The electronic control unit 98 may initiate the zero flow mode during engine cold starts, when coolant flow would otherwise prolong the time required for the engine to reach a normal operating temperature. The cover 99 may include a single plug connection 101 and the electronic control unit 98 may include a single electrical connector 102 that extends from the printed circuit board 100 and through the single plug connection 101 in the cover. This allows the electronic control unit 98 to be controlled using a LIN, CAN, or PWM communication protocol and allows for improved response time and simplified wiring.

The software in the electronic control unit 98 can control both the electric motor 72 and the first clutch 52. This can allow better hand-off between the drive between electric and mechanical than if they were connected to the engine ECU separately. This results in no lag time between when the first clutch 52 is engaged or disengaged and when the electronic control unit 98 receives a signal communicating the engagement state of the first clutch 52. If a speed-sensor to pick up the pulley speed (not shown) is provided, including when the first clutch 52 is decoupled, the electronic control unit 98 could look at pulley speed and rates of increase in speed to decide when to engage the first clutch 52 to drive couple the drive. Optionally, the electronic control unit 98 may be positioned in direct contact with the housing 22 for improved cooling.

The electronic control unit 98 includes a number of electrical components connected to the printed circuit board 100. These may include integrated circuits, microcontrollers, diodes, and resistors. The electronic control unit 98 may also include a capacitor and an inductor that are connected to the printed circuit board 100 to isolate the power supplied to the electronic control unit 98 from electrical noise. This prevents electrical noise generated by the electronic control unit 98 from disturbing engine electronics.

Figure 6:
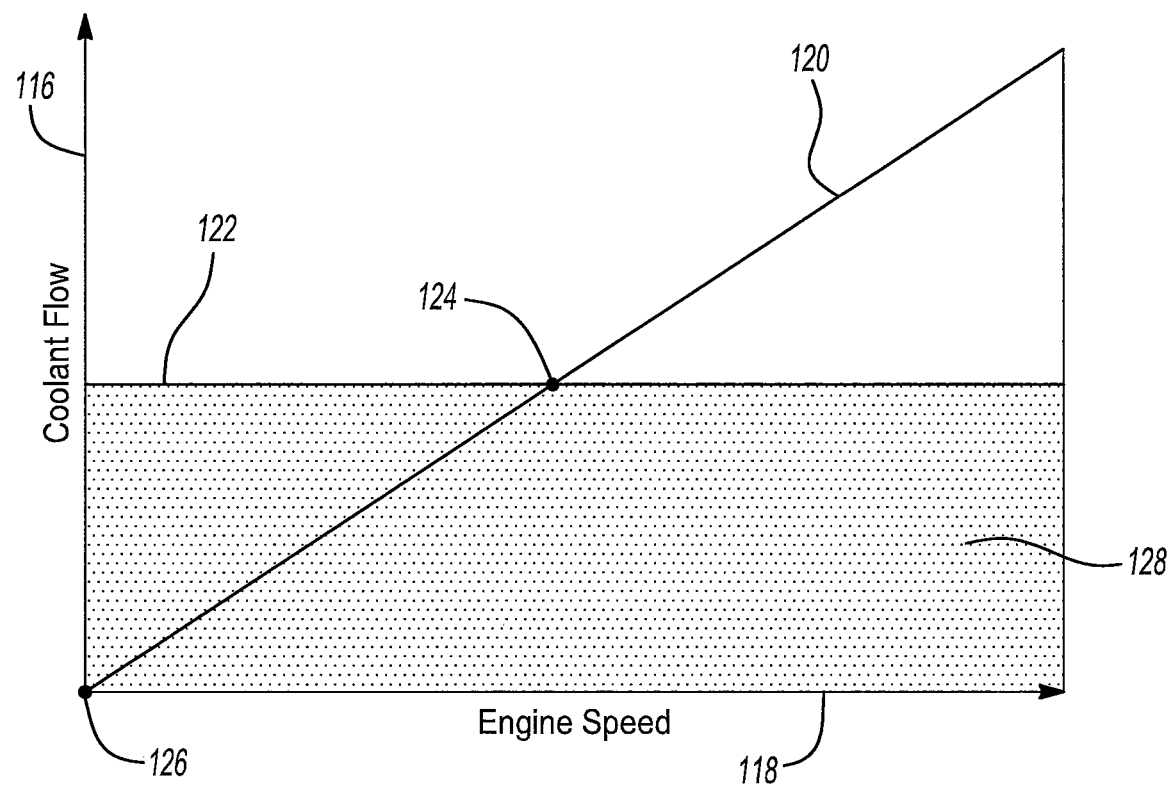
FIG. 6 is a plot illustrating the pumping capacity of the exemplary hybrid coolant pump assembly shown in FIG. 1.

With reference to FIG. 6, a plot illustrating the pumping capacity of the hybrid coolant pump assembly 20 is shown. The vertical axis 116 of the plot represents coolant flow resulting from operation of the hybrid coolant pump assembly 20 and the horizontal axis 118 of the plot represents engine speed (i.e. RPMs). Diagonal line 120 illustrates the pumping capacity of the hybrid coolant pump assembly 20 when the hybrid coolant pump assembly 20 is operating in the mechanical drive mode, where the coolant flow increases linearly with engine speed. Horizontal line 122 illustrates the maximum pumping capacity of the hybrid coolant pump assembly 20 when the hybrid coolant pump assembly 20 is operating in the electric drive mode, where the coolant flow remains constant regardless of engine speed.

The hybrid coolant pump assembly 20 of the subject disclosure is a hybrid that effectively operates as an electrically driven coolant pump at low engine speeds (i.e. at engine speeds below the point 124 where diagonal line 120 and horizontal line 122 intersect) and effectively operates as a mechanically driven coolant pump at high engine speeds (i.e. at engine speeds above the point 124 where diagonal line 120 and horizontal line 122 intersect). It should be appreciated that the hybrid coolant pump assembly 20 provides improved flexibility. At high engine speeds, the impeller apparatus 26 of the hybrid coolant pump assembly 20 is driven by the first clutch 52 at a fixed ratio relative to engine speeds. However, at low engine speeds, when the impeller apparatus 26 of the hybrid coolant pump assembly 20 is driven by the magnetic force the stator 68 applies to the rotor 62, variable speeds are possible by changing the voltage and/or current of the electricity supplied to the stator 68.

In FIG. 6, the zero flow mode of operation is identified by point 126 and anywhere along the horizontal axis 118 at this level where if the first clutch 52 is decoupled you can have any engine speed and still have zero flow if the electric motor 72 is off. The electric drive mode of operation is generally identified by area 128, where the coolant flow and engine speed can be varied anywhere within area 128, and the mechanical drive mode of operation is generally identified by diagonal line 120. An advantage of the hybrid coolant pump assembly 20 described herein is that the electronic control unit 98 can vary or adjust the coolant flow independently of engine speed in the electric drive mode while the bearing shaft 24 in the mechanical drive mode can provide higher coolant flow than would otherwise be possible if one were limited to the electric drive mode only.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A hybrid coolant pump assembly comprising: a housing including an internal cavity; a bearing shaft rotatably supported within said internal cavity of said housing; a first clutch disposed on said bearing shaft, said first clutch having an engaged state wherein said first clutch is adapted to drivingly interconnect an input member and said bearing shaft and a disengaged state wherein said bearing shaft is free to rotate relative to said input member; an impeller apparatus positioned about said bearing shaft and configured to pump a fluid; a rotor disposed within said internal cavity of said housing and surrounding said bearing shaft; a stator disposed within said internal cavity of said housing and surrounding said rotor, said rotor configured to rotate relative to said stator and said bearing shaft when electricity is applied to said stator, said impeller apparatus being rotatably driven by said bearing shaft when said first clutch is in said engaged state, said impeller apparatus being rotatably driven by said rotor when said stator is electrically energized; and an electronic control unit coupled to the housing, the electronic control unit controlling operation of the hybrid coolant pump assembly in one of an idle mode, an electric drive mode, and a mechanical drive mode, wherein the controller operates the first clutch in the disengaged state and does not supply electricity to the stator when operating in the idle mode such that the impeller apparatus is not driven, the electronic control unit operating the hybrid coolant pump in the electric drive mode when the first clutch is in the disengaged state and the stator is electrically energized such that the rotor drives the impeller apparatus, the electronic control unit operating the hybrid coolant pump assembly in the mechanical drive mode by operating the first clutch in the engaged state and not electrically energizing the stator such that the impeller apparatus is driven by the bearing shaft, wherein the electronic control unit includes a printed circuit board extending annularly within the housing, further including a cover and a clutch activation mechanism, each extending about the housing, the cover sealingly engaging the housing and the clutch activation mechanism to define a sealed cavity in which the printed circuit board is positioned, wherein the clutch activation mechanism includes a coil, the printed circuit board being axially positioned between the coil and the stator.

2. The hybrid coolant pump assembly of claim 1, wherein the electronic control unit varies a current applied to the stator to vary the rotational speed of the rotor and the impeller apparatus.

3. The hybrid coolant pump assembly of claim 1, wherein the input member is adapted to be driven by an internal combustion engine and a rotational speed of the impeller apparatus is directly proportional to the rotational speed of the internal combustion engine.

4. The hybrid coolant pump assembly of claim 1, wherein said impeller apparatus includes a first impeller and a second impeller, said first impeller being fixed for rotation with said bearing shaft such that said first impeller rotates with said bearing shaft, said second impeller being fixed for rotation with said rotor, such that said second impeller rotates with said rotor.

5. The hybrid coolant pump assembly of claim 1, wherein the bearing shaft uninterruptedly extends through the housing, the first clutch and the rotor.

6. The hybrid coolant pump assembly of claim 1, further including a second clutch disposed radially between said bearing shaft and said rotor, said second clutch being configured as a one-way clutch that transfers torque from said bearing shaft to said rotor while permitting said rotor to over-run said bearing shaft at a rotational speed that is greater than a rotational speed of said bearing shaft.

7. A hybrid coolant pump assembly for pumping engine coolant, comprising: a housing extending longitudinally along a longitudinal axis between a first housing end and a second housing end; said housing including a first housing portion adjacent said first housing end, a second housing portion adjacent said second housing end, and a flange extending radially outwardly from said second housing end; said housing defining an internal cavity arranged co-axially with said longitudinal axis; a bearing shaft rotatably supported within said internal cavity of said housing, said bearing shaft extending co-axially with said longitudinal axis between a first shaft end and a second shaft end, said bearing shaft including a first shaft segment adjacent said first shaft end, a second shaft segment adjacent said second shaft end, and a medial shaft segment positioned between said first shaft segment and said second shaft segment, said first shaft segment extending longitudinally past said first housing end, said second shaft segment extending longitudinally through said second housing portion and past said second housing end, and said medial shaft segment extending within said first housing portion; a first clutch disposed on said first shaft segment of said bearing shaft adjacent said first shaft end, said first clutch being operable in an engaged state to rotationally fix an input member with said bearing shaft and a disengaged state where said bearing shaft is free to rotate relative to said input member; a clutch activation mechanism extending about said first housing portion adjacent said first end of said housing that operably controls engagement of said first clutch between said engaged state and said disengaged state; an impeller apparatus positioned about said second shaft segment of said bearing shaft adjacent said second shaft end, said impeller apparatus being configured to pump a fluid; a rotor disposed within said internal cavity of said housing that extends about said second shaft segment of said bearing shaft; a stator disposed within said internal cavity of said housing that extends about said rotor, said rotor configured to rotate relative to said stator and said second shaft segment of said bearing shaft when electricity is applied to said stator; a sleeve positioned within said internal cavity that includes a longitudinal section, positioned radially between said stator and said rotor, that extends longitudinally within said second housing portion, said sleeve including an end section that extends radially outwardly at said flange; a plurality of seals disposed between said sleeve and said housing to prevent the fluid from flowing between said sleeve and said housing, said impeller apparatus being rotatably driven by at least one of said bearing shaft and said rotor depending upon engagement of said first clutch and application of electricity to said stator, said impeller apparatus being driven by said bearing shaft when said first clutch is in said engaged state, said impeller apparatus being driven by said rotor when electricity is supplied to said stator, and an electronic control unit including a printed circuit board and being coupled to the housing, the electronic control unit controlling operation of the hybrid coolant pump assembly in one of an idle mode, an electric drive mode, and a mechanical drive mode, wherein the controller operates the first clutch in the disengaged state and does not supply electricity to the stator when operating in the idle mode such that the impeller apparatus is not driven, the electronic control unit operating the hybrid coolant pump in the electric drive mode when the first clutch is in the disengaged state and the stator is electrically energized such that the rotor drives the impeller apparatus, the electronic control unit operating the hybrid coolant pump assembly in the mechanical drive mode by operating the first clutch in the engaged state and not electrically energizing the stator such that the impeller apparatus is driven by the bearing shaft, wherein the clutch activation mechanism includes a coil, the printed circuit board being axially positioned between the coil and the stator.

8. The hybrid coolant pump assembly as set forth in claim 7, wherein said impeller apparatus includes a first impeller and a second impeller, said first impeller being fixed for rotation with said second shaft segment adjacent said second shaft end such that said first impeller rotates with said bearing shaft, and said second impeller being fixed for rotation with said rotor such that said second impeller rotates with said rotor.

9. The hybrid coolant pump assembly as set forth in claim 8, wherein said first and second impellers are independently rotatable relative to one another and wherein said first and second impellers are co-axially arranged and longitudinally co- aligned such that said second impeller is nested within said first impeller.

10. The hybrid coolant pump assembly as set forth in claim 7, wherein said impeller apparatus includes a single impeller that is rotatably coupled with said rotor such that said single impeller rotates with said rotor.

11. The hybrid coolant pump assembly of claim 10, further comprising:
a second clutch disposed radially between said second shaft segment and said rotor, said second clutch being configured as a one-way clutch that transfers torque from said bearing shaft to said rotor while permitting said rotor to over-run said bearing shaft at a rotational speed that is greater than a rotational speed of said bearing shaft.

12. The hybrid coolant pump assembly of claim 7, wherein said first clutch is an electromagnetic clutch and said clutch activation mechanism is a clutch activation coil.

13. The hybrid coolant pump assembly of claim 7, further including first and second bushings extending annularly about said second shaft segment, at least a portion of said first and second bushings being disposed radially between said rotor and said second shaft segment.

14. The hybrid coolant pump assembly of claim 13, further including an axial limiter disposed on said second shaft segment and within said internal cavity of said housing that abuts said first bushing to limit movement of said rotor relative to said bearing shaft along said longitudinal axis.

15. The hybrid coolant pump assembly of claim 7, wherein the electronic control unit varies a current applied to the stator to vary the rotational speed of the rotor and the impeller apparatus.

* * * * *